(12) United States Patent
Uchida (10) Patent No.: US 12,334,609 B2
(45) Date of Patent: Jun. 17, 2025

(54) METHOD FOR CONTROLLING FUEL CELL SYSTEM AND FUEL CELL SYSTEM

(71) Applicant: Nissan Motor Co., Ltd., Yokohama (JP)

(72) Inventor: Hiroshi Uchida, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 18/848,041

(22) PCT Filed: Mar. 22, 2022

(86) PCT No.: PCT/JP2022/013317
§ 371 (c)(1),
(2) Date: Sep. 17, 2024

(87) PCT Pub. No.: WO2023/181136
PCT Pub. Date: Sep. 28, 2023

(65) Prior Publication Data
US 2025/0112256 A1    Apr. 3, 2025

(51) Int. Cl.
*H01M 8/0444* (2016.01)
*H01M 8/04302* (2016.01)
*H01M 8/04746* (2016.01)

(52) U.S. Cl.
CPC ... *H01M 8/04455* (2013.01); *H01M 8/04302* (2016.02); *H01M 8/04776* (2013.01); *H01M 2250/20* (2013.01)

(58) Field of Classification Search
CPC ......... H01M 2250/10; H01M 2250/20; H01M 2250/30; H01M 2250/40
See application file for complete search history.

(56) References Cited

U.S. PATENT DOCUMENTS

2014/0342257 A1    11/2014    Tsukagoshi et al.

FOREIGN PATENT DOCUMENTS

| JP | H06-260203 A | 9/1994 |
|---|---|---|
| JP | 2000-012046 A | 1/2000 |
| JP | 2004-047438 A | 2/2004 |
| JP | 2005-200260 A | 7/2005 |
| JP | 2016-023127 A | 2/2016 |
| WO | 2013/111777 A1 | 8/2013 |

*Primary Examiner* — Matthew W Van Oudenaren
(74) *Attorney, Agent, or Firm* — Young Basile Hanlon & MacFarlane, P.C.

(57) ABSTRACT

A control method for controlling a fuel cell system includes: setting a fuel composition and a fuel flow rate to a combustor as unknown numbers and setting conditions of an air flow rate to the combustor; estimating composition ratios of the components constituting the mixed gas based on simultaneous equations including at least one of a first characteristic equation based on a relationship between an amount of air supplied to and an oxygen concentration in an exhaust gas discharged from the combustor and a second characteristic equation based on a relationship between the amount of air supplied to and a temperature of the exhaust gas discharged from the combustor, and a composition equation representing a sum of the composition ratios of the types of the components of the mixed gas; and adjusting a flow rate of the fuel supplied to the fuel cell based on the estimated composition ratios.

10 Claims, 4 Drawing Sheets

| | COMBUSTION HEAT | SPECIFIC HEAT RATIO | MOLECULAR WEIGHT |
|---|---|---|---|
| METHANE | 40 | 1.3 | 16 |
| ETHANE | 71 | 1.2 | 30 |
| PROPANE | 99 | 1.14 | 44 |
| BUTANE | 128 | 1.06 | 58 |

FIG. 6

| | FIRST | SECOND | THIRD |
|---|---|---|---|
| METHANE | 93.18% | 89.83% | 80.65% |
| ETHANE | 0% | 0% | 19.35% |
| PROPANE | 0% | 10.17% | 0% |
| BUTANE | 6.82% | 0% | 0% |
| SPECIFIC HEAT RATIO TERM (A) | 9.051 | 9.049 | 9.126 |
| MOLECULAR WEIGHT TERM (B) | 0.05301 | 0.05306 | 0.05345 |
| (A)*(B) | 0.4798 | 0.4801 | 0.4878 |

METHOD FOR CONTROLLING FUEL CELL SYSTEM AND FUEL CELL SYSTEM

TECHNICAL FIELD

The present invention relates to a method for controlling a fuel cell system, and a fuel cell system.

BACKGROUND ART

In the related art, it has been proposed to use a city gas as a fuel for a fuel cell. The city gas (mixed gas) can be reformed in a reformer or a fuel cell having a reforming function, and used as a fuel. However, the city gas is defined by a heat quantity per unit volume, and a variation in a composition thereof may occur. Accordingly, when the composition of the city gas changes, an amount of hydrogen produced by the reforming changes, making it difficult to supply the amount of hydrogen corresponding to a required output of the fuel cell.

In order to solve this problem, in JP 2005-200260 A, a fuel is combusted in a combustion portion during start-up, a quantity of heat generated per supplied fuel amount at that time is obtained, and the number of carbon atoms contained in the fuel is estimated based on a previously created line diagram.

SUMMARY OF INVENTION

However, it is difficult to accurately estimate the amount of hydrogen produced by the reforming by simply estimating the number of carbon atoms as in the above literature.

Therefore, an object of the present invention is to provide a method for controlling a fuel cell system and a fuel cell system control apparatus capable of accurately estimating a composition of a mixed gas.

According to an aspect of the present invention, there is provided a control method for controlling a fuel cell system including a fuel cell using, as a fuel, a mixed gas containing a plurality of types of components (saturated hydrocarbon or hydrogen), a fuel supply mechanism configured to supply the mixed gas to the fuel cell, the fuel supply mechanism including a fuel tank that stores the mixed gas, and a combustor configured to generate a combustion gas that heats air supplied to the fuel cell when the fuel cell is started up. In this control method, a fuel composition and a fuel flow rate to the combustor are set as unknown numbers, a plurality of conditions of air flow rate to the combustor are set, composition ratios of the plurality of types of components constituting the mixed gas are estimated based on simultaneous equations including at least one of a first characteristic equation based on a relationship between an amount of air supplied to the combustor and an oxygen concentration in an exhaust gas discharged from the combustor and a second characteristic equation based on a relationship between the amount of air supplied to the combustor and a temperature of the exhaust gas discharged from the combustor, and a composition equation representing a sum of the composition ratios of the plurality of types of the components of the mixed gas. Further, a flow rate of the fuel supplied to the fuel cell is adjusted based on the estimated composition ratios.

According to another aspect of the present invention, there is provided a fuel cell system including: a fuel cell using, as a fuel, a mixed gas containing a plurality of types of components (saturated hydrocarbon or hydrogen); a fuel supply mechanism configured to supply the mixed gas to the fuel cell, the fuel supply mechanism including a fuel tank that stores the mixed gas; a combustor configured to generate a combustion gas that heats air supplied to the fuel cell when the fuel cell is started up; and a control unit configured to control a flow rate of air supplied to the combustor and flow rates of the mixed gas supplied to the combustor and the fuel cell. The control unit sets a fuel composition and a fuel flow rate to the combustor as unknown numbers and sets a plurality of conditions of the air flow rate to the combustor, and estimates composition ratios of the plurality of types of components of the mixed gas based on simultaneous equations including at least one of a first characteristic equation based on a relationship between an amount of air supplied to the combustor and an oxygen concentration in an exhaust gas discharged from the combustor which is detected by an oxygen concentration sensor and a second characteristic equation based on a relationship between the amount of air supplied to the combustor and a temperature of the exhaust gas discharged from the combustor which is detected by a temperature sensor, and a composition equation representing a sum of the composition ratios of the plurality of types of the components of the mixed gas. Further, the control unit adjusts a flow rate of the fuel supplied to the fuel cell based on the estimated composition ratios.

DESCRIPTION OF EMBODIMENTS

Hereinafter, embodiments according to the present invention will be described with reference to the drawings.

First Embodiment

Figure 1:
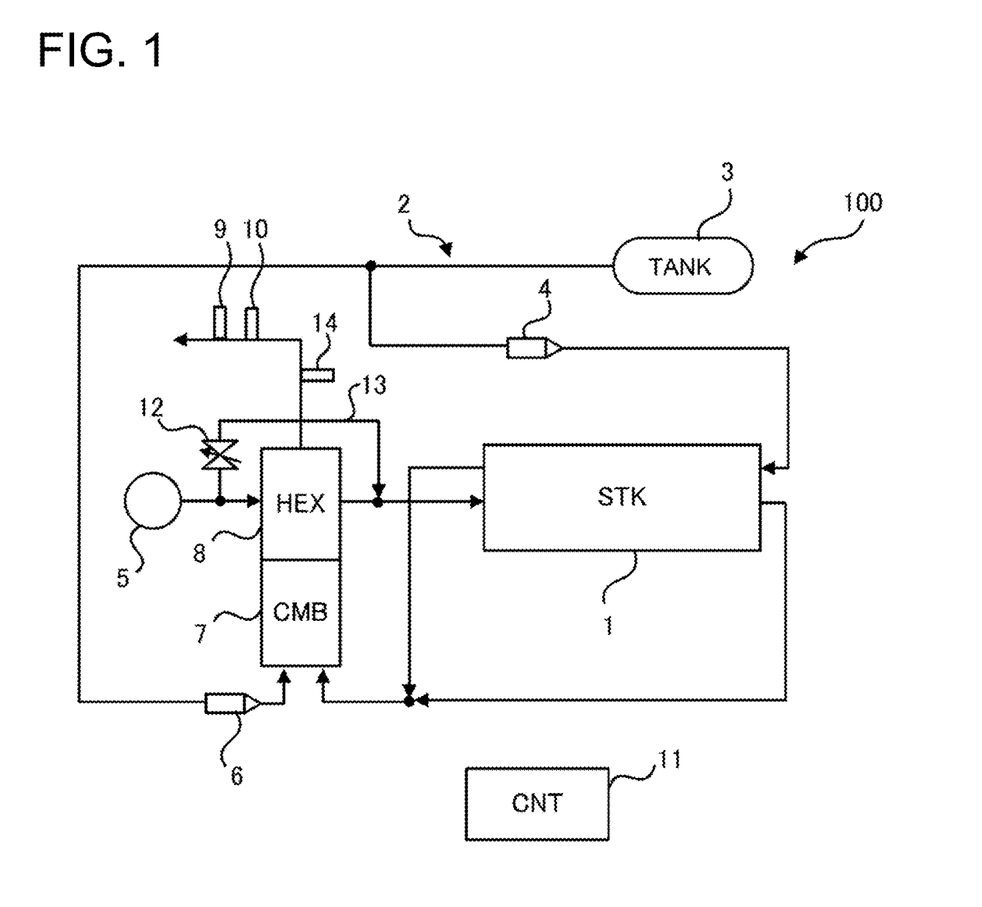
FIG. 1 is a schematic diagram showing a fuel cell system to which a control method according to a first embodiment is applied.

FIG. 1 is a schematic diagram of a fuel cell system 100 to which control according to the present embodiment is applied. A fuel cell system 100 includes a fuel cell (also referred to as a fuel cell stack) 1, a fuel supply mechanism 2 that supplies a mixed gas serving as a fuel to an anode of the fuel cell stack 1, a blower 5 that supplies air to a cathode of the fuel cell stack 1, and a control unit 11 that controls the entire system. The fuel cell system 100 further includes a combustor 7 that generates a combustion gas heating air supplied to the fuel cell stack 1 at start-up, and a heat exchanger 8 that performs a heat exchange between the combustion gas generated in the combustor 7 and the air supplied from the blower 5. A gas flow path for discharging an exhaust gas from the heat exchanger 8 is provided with a temperature sensor 9 that detects a temperature of the exhaust gas, a pressure sensor 10 that detects a pressure of the exhaust gas, and an oxygen concentration sensor (also referred to as an $O_2$ sensor) 14 that detects an oxygen concentration in the exhaust gas.

Although an example of the fuel cell stack 1 is a solid oxide fuel cell (SOFC) containing a catalyst that reforms the mixed gas on an anode side, a reformer may be provided separately from the SOFC. The fuel cell stack 1 can generate a reformed gas (anode gas) containing hydrogen by reforming the mixed gas. Further, the fuel cell stack 1 generates electric power by an electrochemical reaction through an electrolyte of the anode gas (hydrogen) and a cathode gas (oxygen).

The fuel supply mechanism 2 includes a fuel tank 3, a main injector 4 that supplies the fuel to the fuel cell stack 1, and a start-up injector 6 that supplies the fuel to the combustor 7. A non-illustrated pressure reducing valve and a pressure sensor are interposed in gas flow paths between the fuel tank 3 and the main injector 4 and between the fuel tank 3 and the start-up injector 6.

The fuel tank 3 stores the mixed gas at a predetermined pressure. Here, a city gas is applied as the mixed gas. The city gas may contain a plurality of types of chain saturated hydrocarbons, but is not specified in terms of a composition thereof, and is specified in terms of a heat quantity per unit volume. Therefore, when the fuel cell system 100 is mounted on a vehicle, the fuel tank 3 is filled with the mixed gas in different regions, so that a composition of the mixed gas in the fuel tank 3 may change before and after the filling. Further an amount of hydrogen produced by a reforming reaction varies depending on the fuel composition. That is, even if a fuel flow rate is constant, when the fuel composition changes, an amount of hydrogen supplied to the fuel cell stack 1 also changes, and as a result, an output of the fuel cell stack 1 fluctuates. Furthermore, when the amount of hydrogen changes to an insufficient state, there is a risk that the fuel cell stack 1 deteriorates.

Therefore, in order to supply an amount of hydrogen corresponding to a required output of the fuel cell stack 1, it is necessary to accurately estimate the composition of the mixed gas in the fuel tank 3.

The main injector 4 receives a signal from the control unit 11 to adjust a supply amount of the mixed gas.

In addition to a flow path that passes through the heat exchanger 8 and flows into the fuel cell stack 1, a flow path of the air supplied from the blower 5 also includes a bypass flow path 13 that bypasses the heat exchanger 8 and flows into the fuel cell stack 1. A bypass valve 12 that adjusts a flow rate of the air flowing through the flow path is interposed in the bypass flow path 13.

The control unit 11 executes warming control, normal power generation control, stop control, and the like of the fuel cell stack 1. Since the normal control and the stop control are techniques in the related art, descriptions thereof will be omitted. Further, the control unit 11 controls the fuel supply mechanism 2 to control a flow rate of the mixed gas.

The warming control is control for warming the fuel cell stack 1 when the fuel cell system 100 is started up. Specifically, the combustion gas is generated by combusting the mixed gas and the air supplied to the combustor 7, and the air supplied from the blower 5 is heated in the heat exchanger 8 by the combustion gas, and the heated air is supplied to the fuel cell stack 1. When the warming control is executed, the composition of the mixed gas is estimated by a method to be described later.

[Warming Control]

Figure 2:
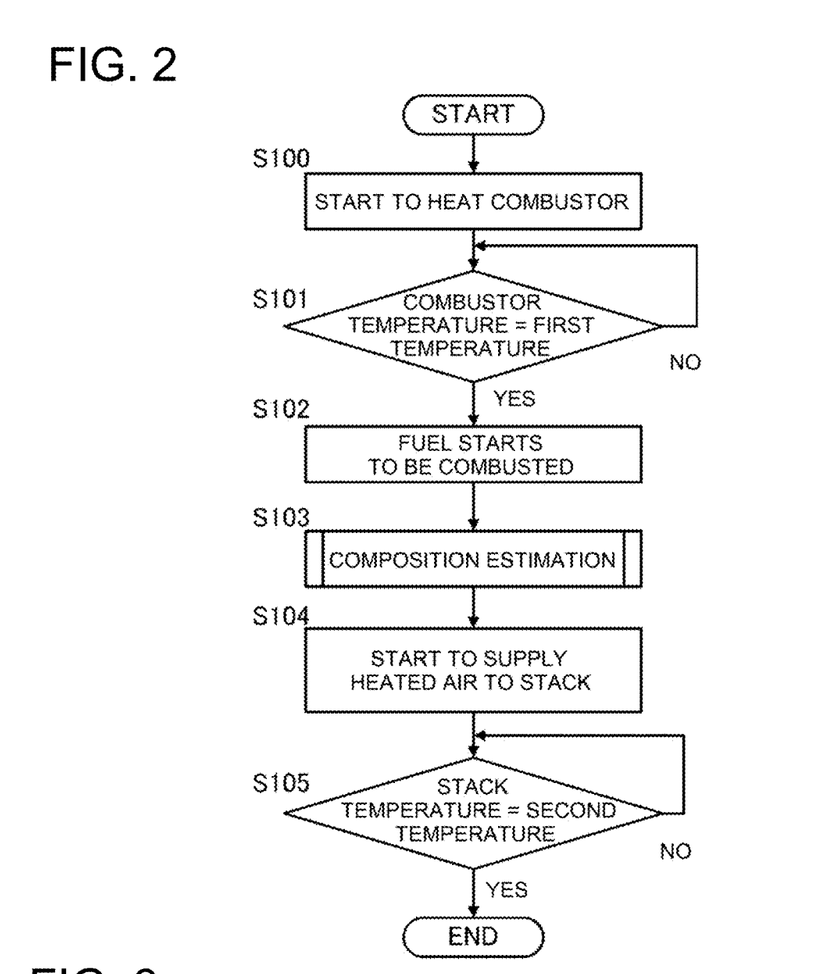
FIG. 2 is a flowchart showing a control routine of warming control.

FIG. 2 is a flowchart showing a control routine for the warming control executed by the control unit 11. The warming control is executed in response to a start request according to an operation or the like of a driver.

In step S100, heating of the combustor 7 is started by operating a heater (not shown).

In step S101, whether a temperature of the combustor 7 has attained a first temperature is determined, when the temperature has attained the first temperature, a process of step S102 is executed, and when the temperature has not attained the first temperature, this determination is repeated. The first temperature here is a temperature at which the combustion is possible in the combustor 7.

In step S102, the mixed gas and the air are supplied to the combustor 7 to start the combustion. The mixed gas is supplied through the start-up injector 6. The air is supplied from the blower 5 to the fuel cell stack 1 via the bypass flow path 13, and the air that has passed through the fuel cell stack 1 is supplied.

An upper limit of a flow rate (fuel flow rate) of the mixed gas supplied at this time is assumed to be a fuel flow rate under the assumption that the chain saturated hydrocarbons constituting the mixed gas is methane and ethane, and a heat quantity per unit volume of the mixed gas is an upper limit heat quantity of the mixed gas used in the region. As described above, since the city gas is defined by the heat quantity per unit flow rate, heat quantity data for each region is stored in a memory of the control unit 11 in advance, and the upper limit heat quantity can be acquired by comparing the heat quantity data with position information acquired by a navigation system or the like. The reason why the upper limit is set in this way is to prevent an excessive temperature rise of the combustor 7.

Here, the reason why an upper limit of the fuel flow rate is determined as described above will be described.

An attainment temperature of the combustor 7 is determined by the supplied heat quantity. Further, the heat quantity is represented by a product of the heat quantity per unit volume, the fuel flow rate, and a time.

A fuel flow rate passing through the start-up injector 6 can be regarded as a flow rate W of a fluid passing through an orifice, and can be represented by Formula (1).

[Math. 1]

$$W = KA\left(\frac{2\gamma}{\gamma-1}\left(\frac{P_{in}}{\rho_{in}} - \frac{P_{th}}{\rho_{th}}\right)\right)^{0.5} k_{byps} \quad (1)$$

In Formula (1), K is a flow coefficient [−], A is an orifice cross-sectional area [m²], γ is a specific heat ratio [−], ρ is density [kg/m³], P is a pressure [Pa], and $k_{byps}$ is a bypass valve opening degree [−].

In Formula (1), since γ is a physical property value of the fluid (mixed gas), when the composition of the mixed gas is unknown, 2γ/(γ−1) on the right side is unknown, and the flow rate W cannot be calculated.

That is, in a state in which the composition of the mixed gas is unknown, the heat quantity per unit volume and the fuel flow rate are unknown, and the heat quantity supplied to the combustor 7 cannot be calculated.

Therefore, the heat quantity per unit volume is assumed to be the upper limit heat quantity of the mixed gas used in the region. The flow rate is calculated assuming that components constituting the mixed gas are methane and ethane. Under this assumption, since there are two components, composition ratios are determined based on the heat quantity per unit volume. Further, when the composition ratios are determined, γ, which is the physical property value, is also determined, and the flow rate can be calculated.

Here, the reason why the components constituting the mixed gas are assumed to be two components, that is, methane and ethane, will be described.

The right side of Formula (1) can be expanded as shown in Formula (2).

[Math. 2]

$$KA\left(\frac{2\gamma}{\gamma-1}\left(\frac{P_{in}}{\rho_{in}}-\frac{P_{th}}{\rho_{th}}\right)\right)^{0.5} k_{byps} = KA\left(\frac{2\gamma}{\gamma-1}\frac{R}{M}(T_{in}-T_{th})\right)^{0.5} k_{byps}$$
$$= KA\left(\frac{2}{1-\frac{1}{\gamma}}\frac{R}{M}(T_{in}-T_{th})\right)^{0.5} k_{byps}$$
(2)

In Formula (2), M is a molecular weight of the mixed gas, and T is a temperature of the mixed gas.

In Formula (2), the physical property of the mixed gas is related to a term of $2/(1-(1/\gamma))$, which is related to the specific heat ratio (hereinafter, also referred to as a specific heat ratio term), and a term of R/M, which is related to the molecular weight (hereinafter, also referred to as a molecular weight term). The specific heat ratio term is larger as the specific heat ratio γ of the mixed gas is larger. The specific heat ratio γ of the mixed gas is determined according to the composition ratios of the contained components. The molecular weight term is larger as the molecular weight M of the mixed gas is smaller. The molecular weight M is also determined according to the composition ratios of the contained components.

Figure 5:
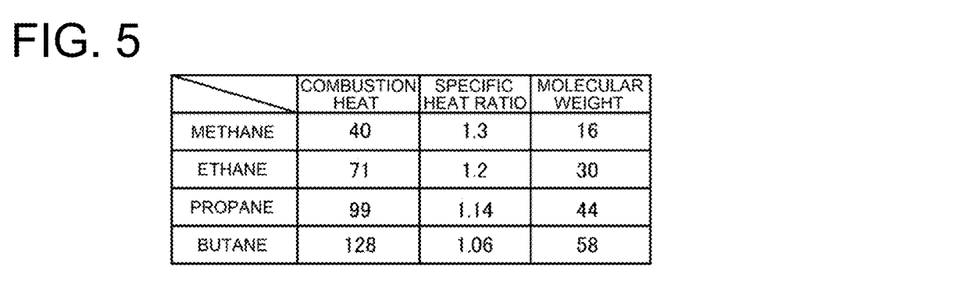
FIG. 5 is a table summarizing combustion heat, a specific heat ratio, and a molecular weight of an individual chain saturated hydrocarbon that may be contained in a mixed gas.

FIG. 5 is a table summarizing combustion heat, a specific heat ratio, and a molecular weight of an individual chain saturated hydrocarbon (methane, ethane, propane, and butane) that can be contained in the mixed gas. As shown in the figure, the smaller the number of carbon atoms, the larger the specific heat ratio, and the smaller the combustion heat and molecular weight. That is, as components having a low carbon number increase, the specific heat ratio term and the molecular weight term of the mixed gas become large.

Figure 6:
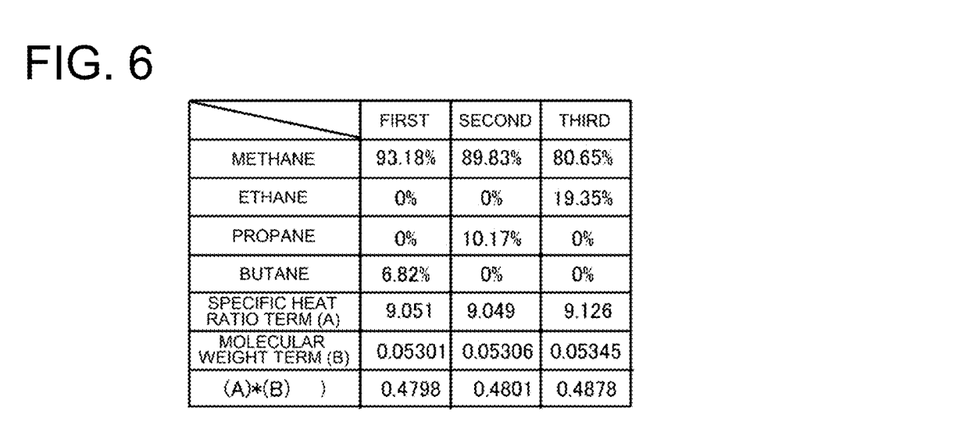
FIG. 6 is a table summarizing composition ratios, a specific heat ratio term, a molecular weight term, and a product of the specific heat ratio term and the molecular weight term of each of first to third mixed gases containing two types of saturated hydrocarbons.

FIG. 6 is a table summarizing composition ratios, a specific heat ratio term, a molecular weight term, and a product of the specific heat ratio term and the molecular weight term of each of first to third mixed gases containing two types of saturated hydrocarbons. The first to third mixed gases each have a heat quantity of 46 $MJ/m^3$ per unit volume according to a regulation. The first mixed gas contains two components, that is, methane and butane, the second mixed gas contains two components, that is, methane and propane, and the third mixed gas contains two components, that is, methane and ethane. As shown in the figure, the specific heat ratio term and the molecular weight term of the third mixed gas having the highest amount of low carbon components, that is, the mixed gas containing the two components of methane and ethane, are the largest.

The reason for setting the upper limit on the fuel flow rate is to prevent the excessive temperature rise in the combustor 7, so it is desirable that the upper limit on the fuel flow rate is set to be the largest flow rate of the conceivable combinations of constituent components. Therefore, the combination that maximizes the product of the specific heat ratio term and the molecular weight term, that is, the combination of methane and ethane, is selected.

The description returns to the flowchart. In step S103, the composition of the mixed gas is estimated by the method to be described later.

In step S104, the supply of heated air to the fuel cell stack 1 is started. Specifically, by controlling the bypass valve 12 of the bypass flow path 13, the air from the blower 5 is supplied to the heat exchanger 8, and the heat exchange between the air and the combustion gas generated in the combustor 7 is performed in the heat exchanger 8. Further, the air heated by the heat exchanger 8 is supplied to the fuel cell stack 1.

In step S105, whether the temperature of the fuel cell stack 1 has attained a second temperature is determined, when the temperature has attained the second temperature, this routine ends, that is, the warming control ends, and when the temperature has not attained the second temperature, this determination is repeated. Here, the second temperature is a warming completion temperature, that is, a temperature at which the above electrochemical reaction is possible.

[Composition Estimation of Mixed Gas]

Here, the composition estimation of the mixed gas executed in step S103 will be described.

In the present embodiment, first, the fuel composition and the fuel flow rate to the combustor 7 are set to be unknown numbers. Further, a plurality of conditions of an air flow rate to the combustor 7 are set, and simultaneous equations including a first characteristic equation based on a relationship between an amount of air supplied to the combustor 7 and the oxygen concentration in the exhaust gas discharged from the combustor and a composition equation representing a sum of composition ratios of a plurality of types of components of the mixed gas are established. The composition ratios of the components are calculated by solving the simultaneous equations.

The first characteristic equation indicates a relationship (that is, a mass conservation law) in which an amount of oxygen in the air supplied to the combustor 7 at the start-up is equal to a sum of an amount of oxygen in the exhaust gas and an amount of oxygen consumed by combustion in the combustor 7.

Here, the composition equation and the first characteristic equation will be described with reference to FIG. 3.

Figure 3:
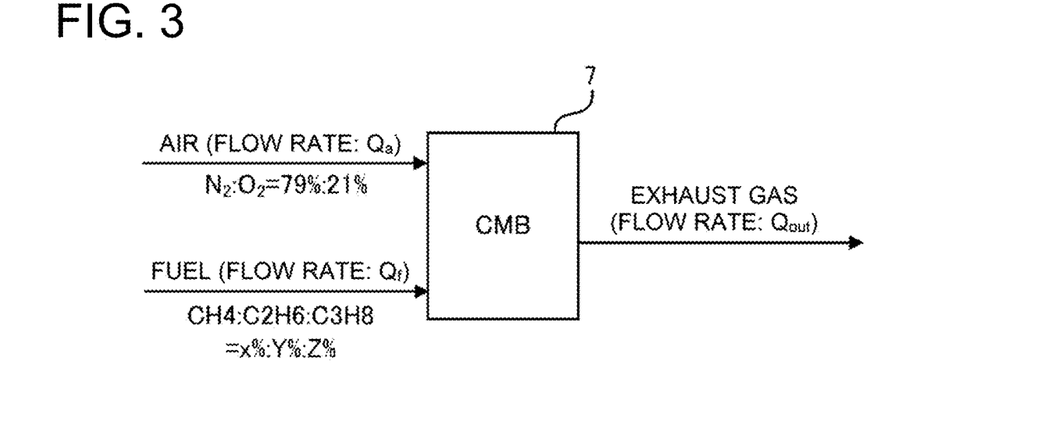
FIG. 3 is diagram showing a relationship between gases flowing into a combustor 7 and a discharged gas.

FIG. 3 is a diagram showing a relationship between gases flowing into the combustor 7 and the discharged gas. As shown in the figure, the air and the mixed gas as the fuel flow into the combustor 7. The air flow rate is defined as $Q_{air}$, and the fuel flow rate is defined as $Q_f$. Components of the air can be considered to be 79% nitrogen ($N_2$) and 21% oxygen ($O_2$). The mixed gas may contain a plurality of types of chain saturated carbons, specifically methane ($CH_4$), ethane ($C_2H_6$), propane ($C_3H_8$), butane ($C_4H_{10}$), and the like, respective composition ratios thereof be x %, y %, z %, and the like.

Regarding the composition ratios, a relationship represented by Formula (3) is established.

[Math. 3]

$$x + y + z + \ldots = 100 \tag{3}$$

Formula (3) is also referred to as a composition equation.

When the components contained in the mixed gas are methane, ethane, and propane, each component reacts as follows if the combustion in the combustor 7 is complete combustion.

$$CH_4 + 2O_2 \rightarrow CO_2 + 2H_2O$$

$$C_2H_6 + 3.5O_2 \rightarrow 2CO_2 + 3H_2O$$

$$C_3H_8 + 5O_2 \rightarrow 3CO_2 + 4H_2O$$

Further, a flow rate $Q_{out}$ of the exhaust gas discharged from the combustor 7 is represented by Formula (4).

[Math. 4]

$$Q_{out} = Q_f \cdot \frac{(x+2y+3z+2x+3y+4z)}{100} + Q_{an} \cdot \frac{79}{100} + V_{O2} \cdot O_{out} \quad (4)$$

In a first term on the right side of Formula (4), x+2y+3z is a $CO_2$ component, 2x+3y+4z is a $H_2O$ component, and a second term on the right side is a $N_2$ component, and a third term on the right side is an $O_2$ component.

Further, according to the mass conservation law of oxygen, a relationship of Formula (5) is established. Formula (5) is defined as the first characteristic equation.

[Math. 5]

$$Q_{an} \cdot \frac{21}{100} = V_{O2} \cdot \left( \frac{Q_f \cdot (3x+5y+7z)}{100} + \frac{Q_{a1} \cdot 79}{100} \right) / (1 - V_{O2}) + \frac{Q_f \cdot (2x+3.5y+5z)}{100} \quad (5)$$

The left side of Formula (5) is the amount of oxygen flowing into the combustor 7, the first term on the right side thereof is the amount of oxygen in the exhaust gas detected by the $O_2$ sensor 14, and the second term on the right side is the amount of oxygen consumed for the combustion.

A plurality of Formulas (5) are derived by setting the fuel flow rate $Q_f$, which is an unknown number, as a fixed value, changing an air flow rate $Q_a$ to $Qa_1$, $Qa_2$, and the like, and detecting the oxygen concentration in the exhaust gas. Further, the composition ratios x %, y %, and z % are calculated by solving the simultaneous equations including the composition equation and the plurality of Formulas (5). Hereinafter, a specific estimation method will be described with reference to FIG. 4.

Figure 4:
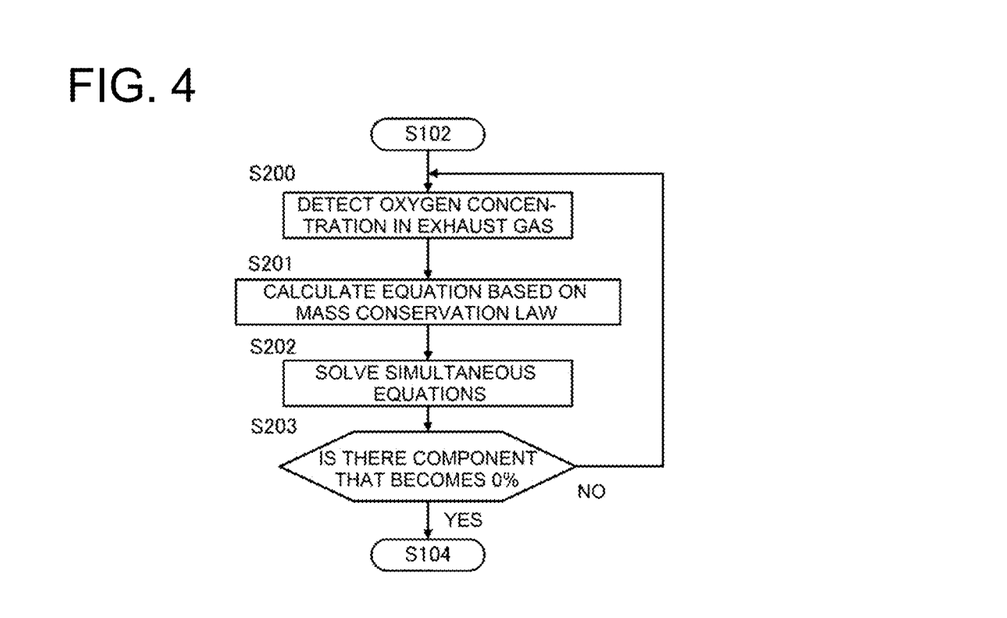
FIG. 4 is a flowchart showing a control routine for a composition estimation according to the first embodiment.

FIG. 4 is a flowchart showing a control routine for the above-described composition estimation, that is, a control routine executed by the control unit 11 in step S103 of FIG. 3.

In step S200, the oxygen concentration in the exhaust gas is detected.

In step S201, Formula (5) is derived as the first characteristic equation. In a first calculation, Formula (5) is derived assuming that methane is the only chain saturated hydrocarbon in the mixed gas. The initial value ($Q_{a1}$) of the air flow rate Qan in Formula (5) is a flow rate at which the complete combustion is achieved when the fuel flow rate is the above-described upper limit.

In step S202, simultaneous equations including the composition equation and Formula (5) are solved.

In step S203, whether any of the composition ratios of the components is 0% is determined, if there is a component that becomes 0%, this routine ends and the process of step S104 in FIG. 1 is executed, and if not, the process returns to step S200.

In second and subsequent calculations, in step S203, the condition of the air flow rate, that is, the air flow rate $Q_{an}$, is increased to $Q_{a2}$, $Q_{a3}$, and the like until one of the components becomes 0%, and the types of the components are also added. That is, by increasing the condition of the air flow rate, Formula (5) of numbers required to obtain solutions of the unknown numbers is derived without increasing an unknown number. At this time, the components are added in ascending order of carbon number. Further, the air flow rate $Q_{an}$ has the initial value $Q_{a1}$ as a lower limit, and is changed in an increasing direction from the lower limit. When the condition of the air flow rate is increased, that is, when the air flow rate is changed, an amount of change is equal to or greater than a lower limit of a resolution of the $O_2$ sensor 14.

The reason why this routine ends when one of the components reaches 0% is that 0% of one of the components means that there are no other components.

The above-described estimation of the composition ratios of the mixed gas may be performed when the fuel tank 3 is newly filled with a mixed gas. When the fuel cell system 100 is mounted on a vehicle, the vehicle is moved to a station for supplying the mixed gas in order to fill the mixed gas, an OFF operation is performed on a key, a lid of the fuel tank 3 is opened to fill the mixed gas, the lid is closed after the filling, an ON operation is performed on the key (that is, the fuel cell system 100 is started up), and the vehicle is moved from the station. By the way, a pressure (temperature) of the mixed gas in the fuel tank 3 changes not only due to a decrease in the temperature of the mixed gas after the fuel cell system 100 is stopped, but also due to a change in outside temperature. Accordingly, when a ratio of a pressure of the fuel tank 3 during the OFF operation to a pressure of the fuel tank 3 during the ON operation as a reference exceeds a predetermined value that is equal to or higher than a ratio caused by the change in outside temperature, the control unit 11 may determine that the fuel tank 3 is filled with the mixed gas.

Here, considering the predetermined value regarding the ratio, the mixed gas is not released from the fuel tank 3 from the OFF operation to the ON operation, and there is no change in volume of the fuel tank 3. Accordingly, a pressure $p_{off}$ of the mixed gas in the fuel tank 3 during the OFF operation and a pressure $p_{on}$ of the mixed gas in the fuel tank 3 during the ON operation can be converted from a temperature $T_{off}$ of the mixed gas in the fuel tank 3 during the OFF operation and a temperature $T_{on}$ of the mixed gas in the fuel tank 3 during the ON operation as $P_{on}/P_{off} = T_{on}/T_{off} = (T_{off} + \text{diurnal range})/T_{off} = 1 + \text{diurnal range}/T_{off}$. Considering the case within Japan, a maximum diurnal range (difference between maximum and minimum air temperatures) is 31.5° C. (Nagano), and the minimum air temperature is −41° C. (Asahikawa). Accordingly, 1+diurnal range/$T_{off}$ is calculated as =1+31.5/(273−41)=1.14. Therefore, when a pressure ratio $P_{on}/P_{off}$ exceeds 1.14, the control unit 11 can determine that the fuel tank 3 is in a state immediately after being filled with the mixed gas.

When the fuel tank 3 is filled with the mixed gas, the lid is opened and closed as described above, and thus the control unit 11 may determine whether the ratio of the pressure of the fuel tank 3 during the ON operation to the pressure of the fuel tank 3 during the above-described OFF operation as the reference exceeds the predetermined value when the lid is opened or closed. Further, the above determination may be made when the control unit 11 determines based on navigation information or the like that a gas supply company is different from the station where the gas was filled last time.

When the composition of the mixed gas is estimated as described above and the warming of the fuel cell stack 1 is completed (that is, when the control routine in FIG. 2 is completed), the control unit 11 adjusts a flow rate of the fuel supplied to the fuel cell stack 1. Specifically, the fuel flow rate is calculated by Formula (1) based on the physical property value (for example, the specific heat ratio 7) of the mixed gas based on the estimated composition, a flow path index (for example, an orifice diameter A in Formula (1)) of a flow rate adjustment unit of the fuel supply mechanism 2, and an index (for example, the pressure and the temperature) representing a state of the mixed gas, and a pressure reducing valve (not illustrated) is adjusted based on the calculated fuel flow rate.

As described above, the present embodiment provides the control method for controlling the fuel cell system 100 including the fuel cell stack (fuel cell) 1 that uses the mixed gas containing a plurality of types of components as the fuel, the fuel supply mechanism 2 that includes the fuel tank 3 storing the mixed gas and supplies the mixed gas to the fuel cell stack 1, and the combustor 7 that generates the combustion gas heating the air supplied to the fuel cell stack 1 when the fuel cell stack 1 is started up. In this control method, the fuel composition and the fuel flow rate to the combustor 7 are set as the unknown numbers, a plurality of conditions of the air flow rate to the combustor 7 are set, the composition ratios of the plurality of types of components of the mixed gas are estimated based on the simultaneous equations including the first characteristic equation based on the relationship between the amount of air supplied to the combustor 7 and the oxygen concentration in the exhaust gas discharged from the combustor 7, and the composition equation representing the sum of the composition ratios of the plurality of types of components of the mixed gas, and the flow rate of the fuel supplied to the fuel cell stack 1 is adjusted based on the estimated composition ratios. The first characteristic equation indicates the relationship in which the amount of oxygen in the air supplied to the combustor 7 at the start-up is equal to the sum of the amount of oxygen in the exhaust gas and the amount of oxygen consumed by the combustion in the combustor 7, and when the composition ratios of the plurality of types of components of the mixed gas are estimated based on the simultaneous equations including the first characteristic equation and the composition equation, by changing the condition of the air flow rate to the combustor 7, the first characteristic equation of the numbers required to obtain the solutions of the unknown numbers is derived.

According to the present embodiment, the composition ratios can be estimated by simply increasing the condition of the air flow rate while the fuel flow rate is set as the unknown number. Since not only the carbon number but also the specific composition ratios can be estimated, accuracy of estimating the amount of hydrogen after the reforming is improved. Since the fuel flow rate may remain as the unknown number, a device that detects the fuel flow rate is not required.

In the present embodiment, the case in which the component contained in the mixed gas is only methane is set as an initial setting, the condition of the air flow rate and the types of components are added from the case, the composition ratios of the plurality of types of components are estimated based on the simultaneous equations, and the estimation is repeated while the condition of the air flow rate is changed until one of the plurality of types of components becomes 0%. Accordingly, it is possible to accurately estimate the composition and the composition ratios of the components contained in the mixed gas without performing unnecessary calculations.

In the present embodiment, the components are methane and ethane, and the fuel flow rate is set as the upper limit of the fuel flow rate when the heat quantity of the mixed gas is the upper limit heat quantity of the mixed gas used in the region. Accordingly, the excessive temperature rise of the combustor 7 can be prevented.

In the present embodiment, the air flow rate in the initial setting is set to the flow rate at which the complete combustion is achieved at the upper limit fuel flow rate. Further, when the condition of the air flow rate is changed, the air flow rate in the above initial setting is set as the lower limit, and the air flow rate is increased from the lower limit. Accordingly, it is possible to prevent generation of carbon monoxide by the reaction in the combustor 7.

In the present embodiment, in the case the fuel cell system 100 is mounted on a vehicle and the ON operation is performed after the OFF operation is performed on the key of the vehicle, when the ratio of the pressure in the fuel tank when the ON operation is performed to the pressure in the fuel tank when the OFF operation is performed as the reference is equal to or greater than the predetermined value, the fuel tank is determined to be in a state immediately after being filled with the mixed gas. Further, when the lid of the fuel tank 3 of the vehicle is opened between the ON operation and the OFF operation, whether the pressure of the fuel tank 3 has increased by the predetermined value is determined. Accordingly, it is possible to determine whether the mixed gas has just been charged without adding any special configuration.

In the present embodiment, the flow rate of the fuel supplied to the fuel cell stack 1 is adjusted based on the physical property value of the fuel based on the estimated fuel composition, the flow path index of the flow rate adjustment unit of the fuel supply mechanism, and the temperature and the pressure of the fuel. Accordingly, it is possible to improve the control accuracy of the fuel flow rate supplied to the fuel cell stack 1.

Second Embodiment

The present embodiment is different from the first embodiment in the content of the composition estimation of the mixed gas executed in step S103 of the control routine of the warming control shown in FIG. 2. Other controls are the same as those of the first embodiment. Hereinafter, a method for estimating the composition of the mixed gas according to the present embodiment will be mainly described.

In the present embodiment, first, a fuel composition and a fuel flow rate to the combustor 7 are set to be unknown numbers. Further, a plurality of conditions of an air flow rate to the combustor 7 are set, and simultaneous equations including a second characteristic equation based on a relationship between an amount of air supplied to the combustor 7 and a temperature of an exhaust gas discharged from the combustor 7 and a composition equation representing a sum of composition ratios of a plurality of types of components of the mixed gas are established. The composition ratios of the components are calculated by solving the simultaneous equations.

The second characteristic equation indicates a relationship (that is, an energy conservation law) in which thermal energy of a gas (air and mixed gas) flowing into the combustor 7 during start-up is equal to a sum of thermal energy of an exhaust gas and thermal energy consumed by combustion in the combustor 7.

That is, in the first embodiment, the composition of the mixed gas is estimated by solving the simultaneous equations including the composition equation (Formula (3)) and the plurality of first characteristic equations (Formula (5)), but in the present embodiment, the composition of the mixed gas is estimated by solving the simultaneous equations including the composition equation and the plurality of second characteristic equations.

When the components contained in the mixed gas are methane, ethane, and propane, the composition equation is as described in the first embodiment. In a steady state, all of combustion heat occurs as a change in temperature of the mixed gas, so a relationship of Formula (6) is established. This Formula (6) is defined as the second characteristic equation.

[Math. 6]
$$\text{INFLOW ENERGY} = \text{OUTFLOW ENERGY} \quad (6)$$

Here, when respective enthalpies of methane, ethane, and propane are $H_{me}$, $H_{et}$, and $H_{pr}$, inflow energy is represented by Formula (7), and outflow energy is represented by Formula (8).

[Math. 7]
$$\text{INFLOW ENERGY} = H_{me} \cdot Q_f \cdot \frac{x}{100} + H_{et} \cdot Q_f \cdot \frac{y}{100} + H_{pr} \cdot Q_f \cdot \frac{z}{100} + \frac{Q_a \cdot (79 \cdot C_{N2} + 21 \cdot C_{O2}) \cdot T_{in}}{100} + \frac{Q_f \cdot (x \cdot C_{CH4} + y \cdot C_{C2H6} + z \cdot C_{C3H8}) \cdot T_{in}}{100} \quad (7)$$

[Math. 8]
$$\text{OUTFLOW ENERGY} = Q_a \cdot \frac{79}{100} \cdot C_{N2} \cdot T_{out} + Q_{out} \cdot \frac{V_{O2}}{100} \cdot C_{O2} \cdot T_{out} + Q_f \cdot \frac{(x+2y+3z)}{100} \cdot C_{CO2} \cdot (T_{out} - T_{in}) + Q_f \cdot \frac{(2x+3y+4z)}{100} \cdot C_{H2O} \cdot (T_{out} - T_{in}) \quad (8)$$

In the Formulas (7) and (8), C is specific heat, Tin is a temperature at an inlet of the combustor, and Tout is a temperature at an outlet of the combustor. In the present embodiment, a temperature sensor (not shown) that detects Tin, a pressure sensor (not shown) that detects a pressure of air at the inlet of the combustor, and a pressure sensor (not shown) that detects a pressure of the mixed gas at the inlet of the combustor are provided. The pressure term of each enthalpy is a detection value of the two pressure sensors.

Figure 7:
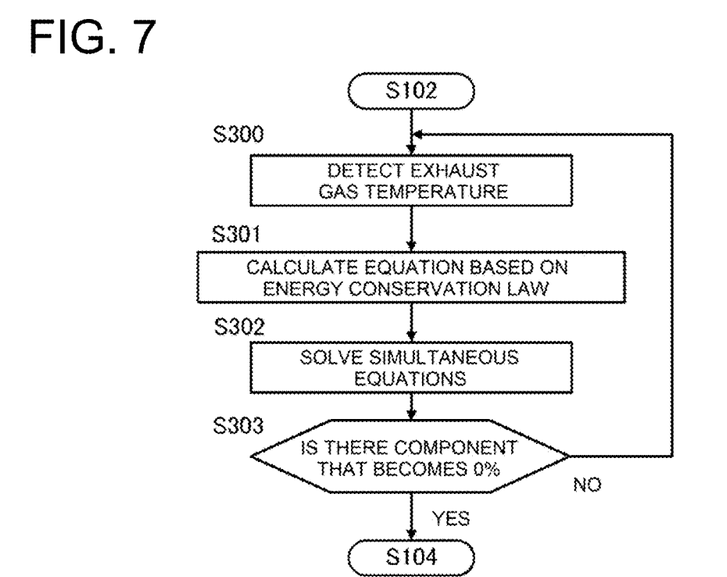
FIG. 7 is a flowchart showing a control routine for a composition estimation according to a second embodiment.

FIG. 7 is a flowchart showing a control routine of a composition estimation according to the present embodiment, that is, a control routine executed by the control unit 11 in step S103 of FIG. 3.

In step S300, the temperature of the exhaust gas discharged from the combustor 7 is detected.

In step S301, the second characteristic equation, that is, Formula (6) is derived. In a first calculation, Formula (6) is derived by assuming that methane is the only component contained in the mixed gas.

In step S302, simultaneous equations including the composition equation (Formula (3)) and Formula (6) are solved.

In step S303, whether any of the composition ratios of the components is 0% is determined, if there is a component that becomes 0%, this routine ends and the process of step S104 in FIG. 1 is executed, and if not, the process returns to step S300.

In second and subsequent calculations, in step S303, a condition of the air flow rate, that is, the air flow rate $Q_{an}$, is increased to $Q_{a2}$, $Q_{a3}$, and the like until one of the components becomes 0%, and the types of the components are also added. That is, by increasing the condition of the air flow rate, Formula (6) of numbers required to obtain solutions of unknown numbers is derived without increasing an unknown number. At this time, the components are added in ascending order of carbon number. Further, the air flow rate $Q_a$ has the initial value $Q_{a1}$ as a lower limit, and is changed in an increasing direction from the initial value $Q_{a1}$.

The reason why this routine ends when one of the components reaches 0% is that 0% of one of the components means that there are no other components.

As described above, the present embodiment provides the control method for controlling the fuel cell system 100 including the fuel cell stack 1 that uses the mixed gas containing the plurality of types of components as the fuel, the fuel supply mechanism 2 that includes the fuel tank 3 storing the mixed gas and supplies the mixed gas to the fuel cell stack 1, and the combustor 7 that generates the combustion gas heating the air supplied to the fuel cell stack 1 when the fuel cell stack 1 is started up. In this control method, the fuel composition and the fuel flow rate to the combustor 7 are set as the unknown numbers, a plurality of conditions of the air flow rate to the combustor 7 are set, the composition ratios of the plurality of types of components of the mixed gas are estimated based on the simultaneous equations including the second characteristic equation based on the relationship between the amount of air supplied to the combustor 7 and the temperature of the exhaust gas discharged from the combustor 7, and the composition equation representing the sum of the composition ratios of the plurality of types of components of the mixed gas, and the flow rate of the fuel supplied to the fuel cell stack 1 is adjusted based on the estimated composition ratios. The second characteristic equation indicates the relationship in which the thermal energy of the gas flowing into the combustor 7 during start-up is equal to the sum of the thermal energy of the exhaust gas and the thermal energy consumed by the combustion in the combustor 7, and when the composition ratios of the plurality of types of components of the mixed gas are estimated based on the simultaneous equations including the second characteristic equation and the composition equation, by changing the condition of the air flow rate to the combustor 7, the second characteristic equation of the numbers required to obtain the solutions of the unknown numbers is derived. Accordingly, the same effects as those of the first embodiment can be obtained.

Third Embodiment

The present embodiment is different from the first and second embodiments in the content of the composition estimation of the mixed gas executed in step S103 of the control routine of the warming control shown in FIG. 2.

Other controls are the same as those of the first and second embodiments. Hereinafter, a method for estimating the composition of the mixed gas according to the present embodiment will be mainly described.

In the present embodiment, the composition of the mixed gas is estimated by solving simultaneous equations including a composition equation, a first characteristic equation, and a second characteristic equation.

Figure 8:
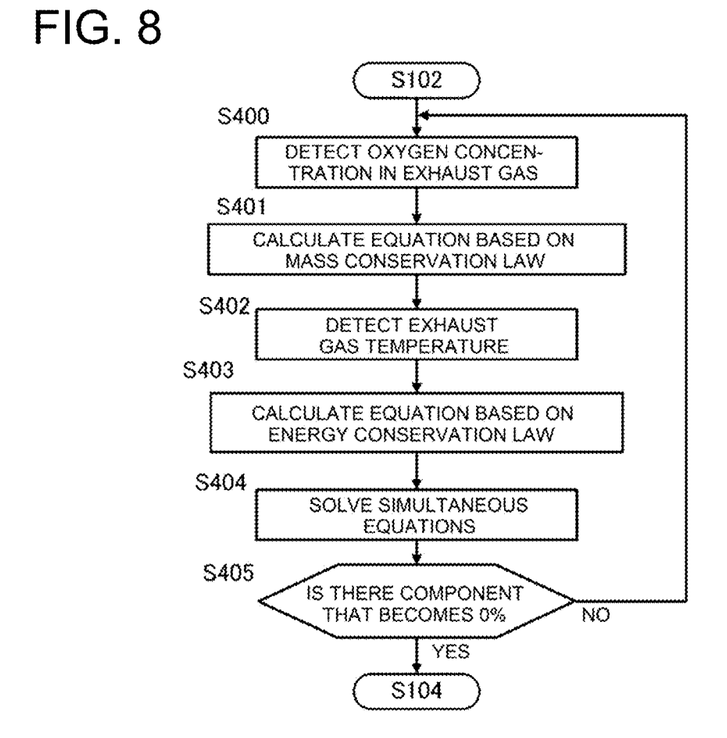
FIG. 8 is a flowchart showing a control routine for a composition estimation according to a third embodiment.

FIG. 8 is a flowchart showing a control routine of a composition estimation according to the present embodiment, that is, a control routine executed by the control unit 11 in step S103 of FIG. 3.

Steps S400 and S401 are the same processes as steps S200 and S201 in FIG. 4 described in the first embodiment, and steps S402 and S403 are the same processes as steps S300 and S301 in FIG. 7 described in the second embodiment.

Steps S403 and S404 are the same processes as steps S202 and S203 in FIG. 4 and steps S302 and S303 in FIG. 7.

As described above, the present embodiment provides the control method for controlling the fuel cell system 100 including the fuel cell stack 1 that uses the mixed gas containing the plurality of types of components as the fuel, the fuel supply mechanism 2 that includes the fuel tank 3 storing the mixed gas and supplies the mixed gas to the fuel cell stack 1, and the combustor 7 that generates the combustion gas heating the air supplied to the fuel cell stack 1 when the fuel cell stack 1 is started up. In this control method, the fuel composition and the fuel flow rate to the combustor 7 are set as the unknown numbers, a plurality of conditions of the air flow rate to the combustor 7 are set, and the composition ratios of a plurality of types of components of the mixed gas are estimated based on the simultaneous equations including the first characteristic equation based on a relationship between an amount of air supplied to the combustor 7 and an oxygen concentration in an exhaust gas discharged from the combustor 7, the second characteristic equation based on a relationship between the amount of air supplied to the combustor 7 and a temperature of the exhaust gas discharged from the combustor 7, and the composition equation representing a sum of the composition ratios of the plurality of types of components of the mixed gas. Further, the flow rate of the fuel supplied to the fuel cell stack 1 is adjusted based on the estimated composition ratios. The first characteristic equation indicates the relationship in which an amount of oxygen in the air supplied to the combustor 7 at the start-up is equal to a sum of an amount of oxygen in the exhaust gas and an amount of oxygen consumed by combustion in the combustor 7. The second characteristic equation indicates a relationship in which thermal energy of a gas flowing into the combustor 7 during start-up is equal to a sum of thermal energy of the exhaust gas and thermal energy consumed by the combustion in the combustor 7. When the composition ratios of the plurality of types of components of the mixed gas are estimated based on the simultaneous equations including the first characteristic equation, the second characteristic equation, and the composition equation, the first characteristic equation and the second characteristic equation of numbers required to obtain solutions of unknown numbers are derived by changing the condition of the air flow rate to the combustor 7. Accordingly, the same effects as the first embodiment and the second embodiment can be obtained.

Although the embodiments of the present invention are described above, the above embodiments are merely a part of application examples of the present invention, and do not mean that the technical scope of the present invention is limited to the specific configurations of the above embodiments.

The invention claimed is:

1. A control method for controlling a fuel cell system, the fuel cell system including a fuel cell using, as a fuel, a mixed gas containing a plurality of types of components, a fuel supply mechanism configured to supply the mixed gas to the fuel cell, the fuel supply mechanism including a fuel tank that stores the mixed gas, and a combustor configured to generate a combustion gas that heats air supplied to the fuel cell when the fuel cell is started up, the control method for controlling a fuel cell system comprising:
    setting a fuel composition and a fuel flow rate to the combustor as unknown variables and setting a plurality of conditions of an air flow rate to the combustor;
    estimating composition ratios of the components constituting the mixed gas based on simultaneous equations including at least one of a first characteristic equation based on a relationship between an amount of air supplied to the combustor and an oxygen concentration in an exhaust gas discharged from the combustor and a second characteristic equation based on a relationship between the amount of air supplied to the combustor and a temperature of the exhaust gas discharged from the combustor, and a composition equation representing a sum of the composition ratios of the plurality of types of the components of the mixed gas; and
    adjusting a flow rate of the fuel supplied to the fuel cell based on the estimated composition ratios.

2. The method for controlling a fuel cell system according to claim 1, wherein
    the first characteristic equation indicates a relationship in which an amount of oxygen in the air supplied to the combustor during start-up is equal to a sum of an amount of oxygen in the exhaust gas and an amount of oxygen consumed by combustion in the combustor, the method further comprising:
    when the composition ratios of the plurality of types of components of the mixed gas are estimated based on the simultaneous equations including the first characteristic equation and the composition equation, changing the conditions of the air flow rate to the combustor to derive a necessary number of first characteristic equations required to obtain solutions of the unknown variables.

3. The method for controlling a fuel cell system according to claim 1, wherein
    the second characteristic equation indicates a relationship in which thermal energy of a gas flowing into the combustor during start-up is equal to a sum of thermal energy of the exhaust gas and thermal energy consumed by combustion in the combustor, the method further comprising:
    when the composition ratios of the plurality of types of components of the mixed gas are estimated based on the simultaneous equations including the second characteristic equation and the composition equation, changing the conditions of the air flow rate to the combustor to derive a necessary number of second characteristic equations required to obtain solutions of the unknown variables.

4. The method for controlling a fuel cell system according to claim 1, wherein
    the first characteristic equation indicates a relationship in which an amount of oxygen in the air supplied to the combustor during start-up is equal to a sum of an amount of oxygen in the exhaust gas and an amount of oxygen consumed by combustion in the combustor, the second characteristic equation indicates a relationship in which thermal energy of a gas flowing into the combustor during start-up is equal to a sum of thermal energy of the exhaust gas and thermal energy consumed by combustion in the combustor, the method further comprising:

when the composition ratios of the plurality of types of components of the mixed gas are estimated based on the simultaneous equations including the first characteristic equation, the second characteristic equation, and the composition equation, changing the conditions of the air flow rate to the combustor to derive a necessary number of first characteristic equations and second characteristic equations required to obtain solutions of the unknown variables.

5. The method for controlling a fuel cell system according to claim 1, further comprising:

setting as an initial setting that the components contained in the mixed gas is only methane; and adding additional components to the mixed gas; and estimating the composition ratios of the plurality of types of components on the simultaneous equations, repeating the estimating while the conditions of the air flow rate are changed until one of the plurality of types of components becomes 0%.

6. The method for controlling a fuel cell system according to claim 1, wherein the components are methane and ethane, the method further comprising:

setting as an upper limit of the fuel flow rate the fuel flow rate when a heat quantity of the mixed gas is an upper limit heat quantity of the mixed gas used in a region.

7. The method for controlling a fuel cell system according to claim 6, wherein the air flow rate in an initial setting is a flow rate at which complete combustion is achieved at the upper limit of the fuel flow rate.

8. The method for controlling a fuel cell system according to claim 7, further comprising:

when the conditions of the air flow rate are changed, setting the air flow rate in the initial setting as a lower limit, and increasing the air flow rate from the lower limit.

9. The method for controlling a fuel cell system according to claim 1, wherein the flow rate of the fuel supplied to the fuel cell is adjusted based on a physical property value of the fuel based on an estimated fuel composition, a flow path index of a flow rate adjustment unit of the fuel supply mechanism, and a temperature and a pressure of the fuel.

10. A fuel cell system comprising:

a fuel cell using, as a fuel, a mixed gas containing a plurality of types of components;

a fuel supply mechanism configured to supply the mixed gas to the fuel cell, the fuel supply mechanism including a fuel tank that stores the mixed gas;

a combustor configured to generate a combustion gas that heats air supplied to the fuel cell when the fuel cell is started up; and a control unit configured to control a flow rate of air supplied to the combustor and flow rates of the mixed gas supplied to the combustor and the fuel cell, wherein the control unit is configured to:

set a fuel composition and a fuel flow rate to the combustor as unknown variables and set a plurality of conditions of an air flow rate to the combustor;

estimate composition ratios of the components constituting the mixed gas based on simultaneous equations including at least one of a first characteristic equation based on a relationship between an amount of air supplied to the combustor and an oxygen concentration in an exhaust gas discharged from the combustor which is detected by an oxygen concentration sensor and a second characteristic equation based on a relationship between the amount of air supplied to the combustor and a temperature of the exhaust gas discharged from the combustor which is detected by a temperature sensor, and a composition equation representing a sum of the composition ratios of the plurality of types of the components of the mixed gas; and adjust a flow rate of the fuel supplied to the fuel cell based on the estimated composition ratios.

* * * * *